(No Model.) 6 Sheets—Sheet 2.
H. B. COOLEY, J. M. NOBLE & J. E. TREVOR.
MACHINE FOR MAKING ENVELOPES.
No. 541,470. Patented June 25, 1895.
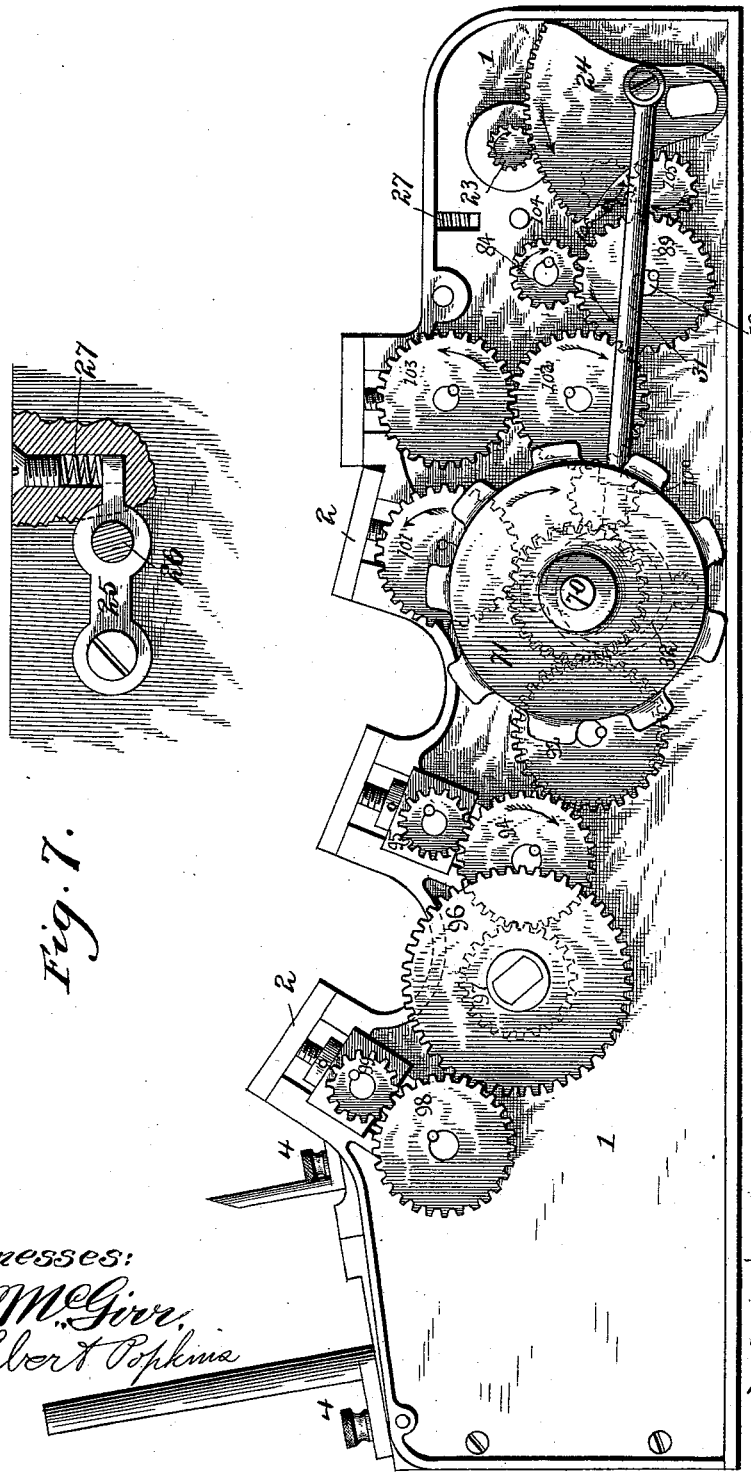

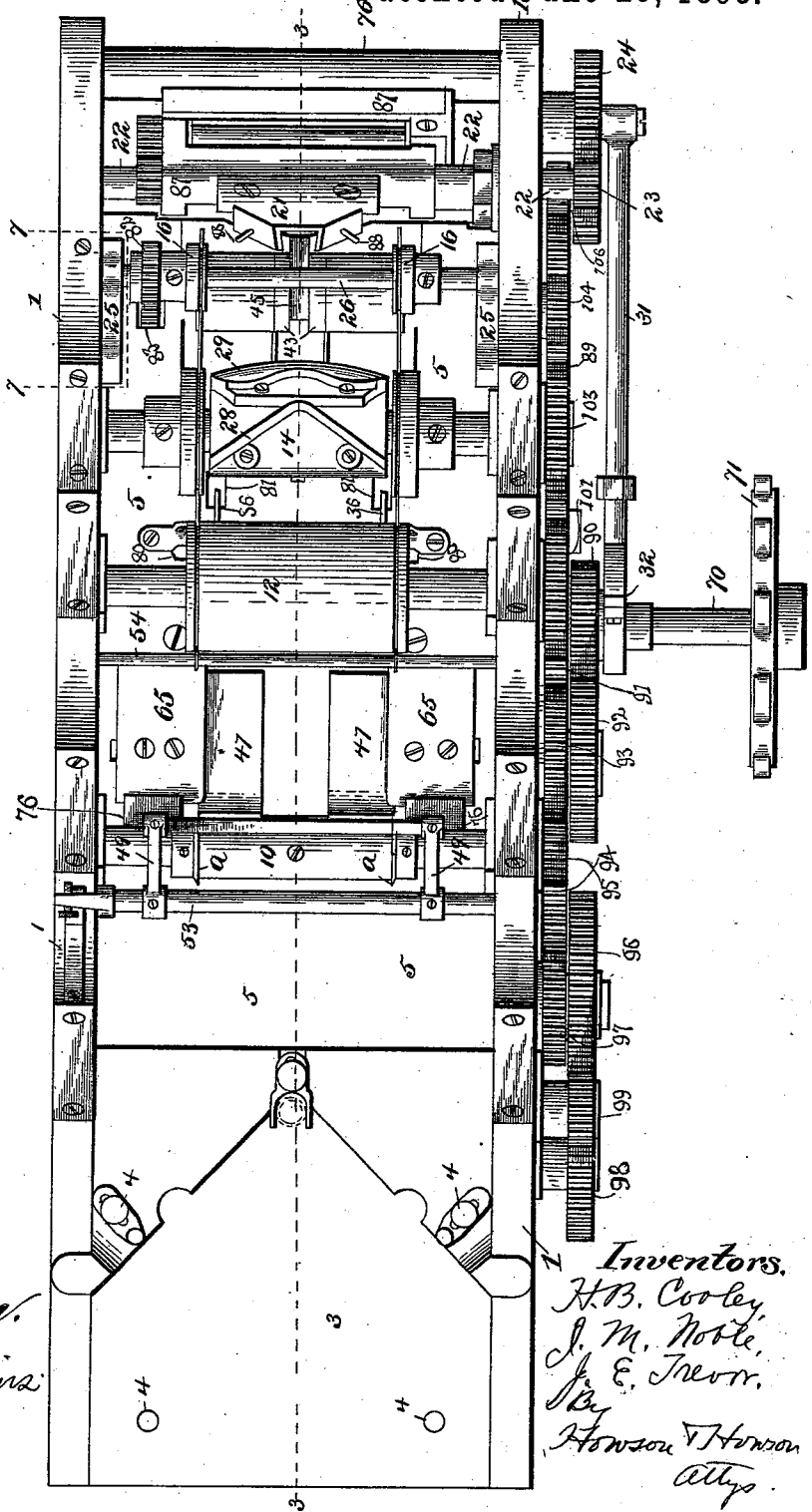

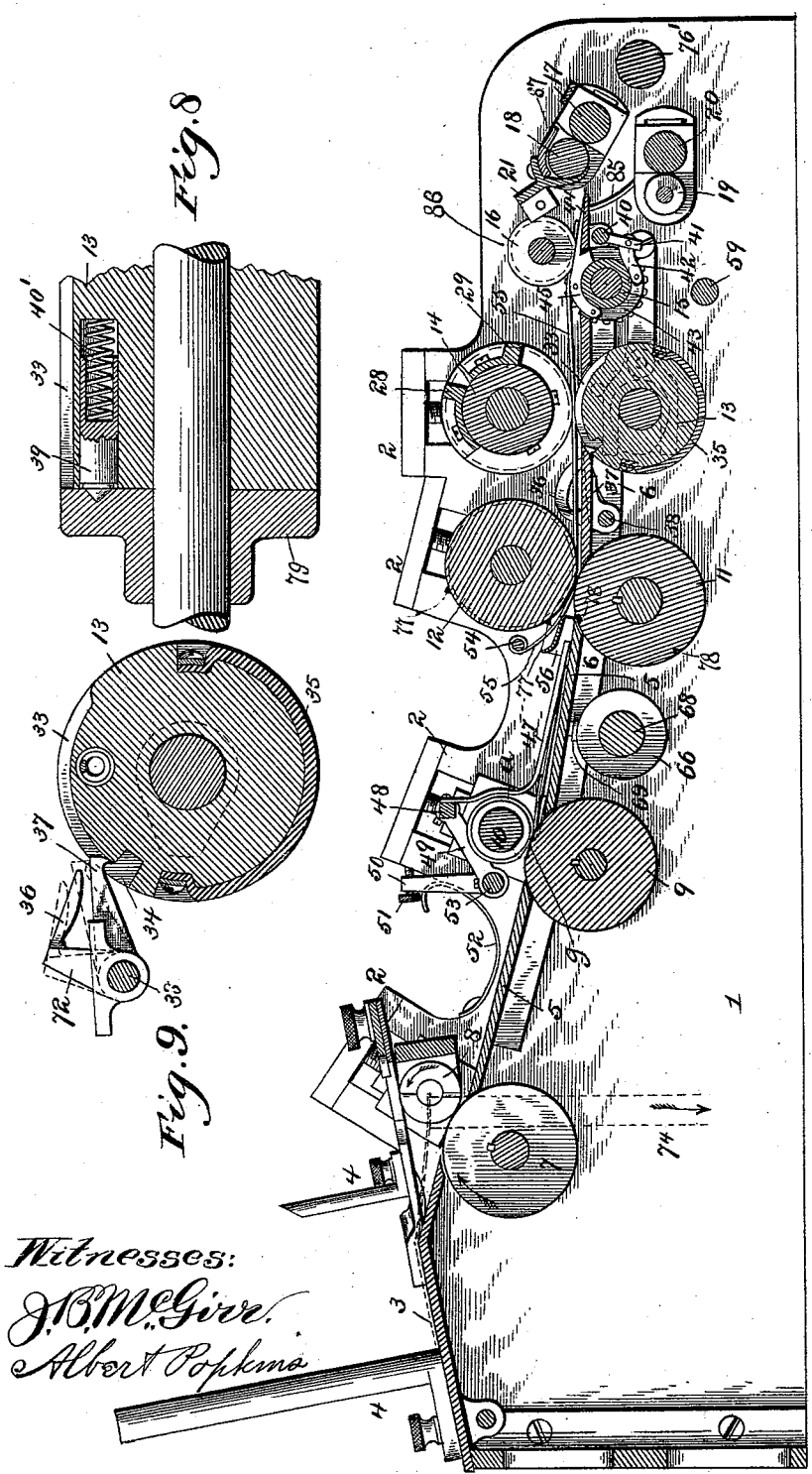

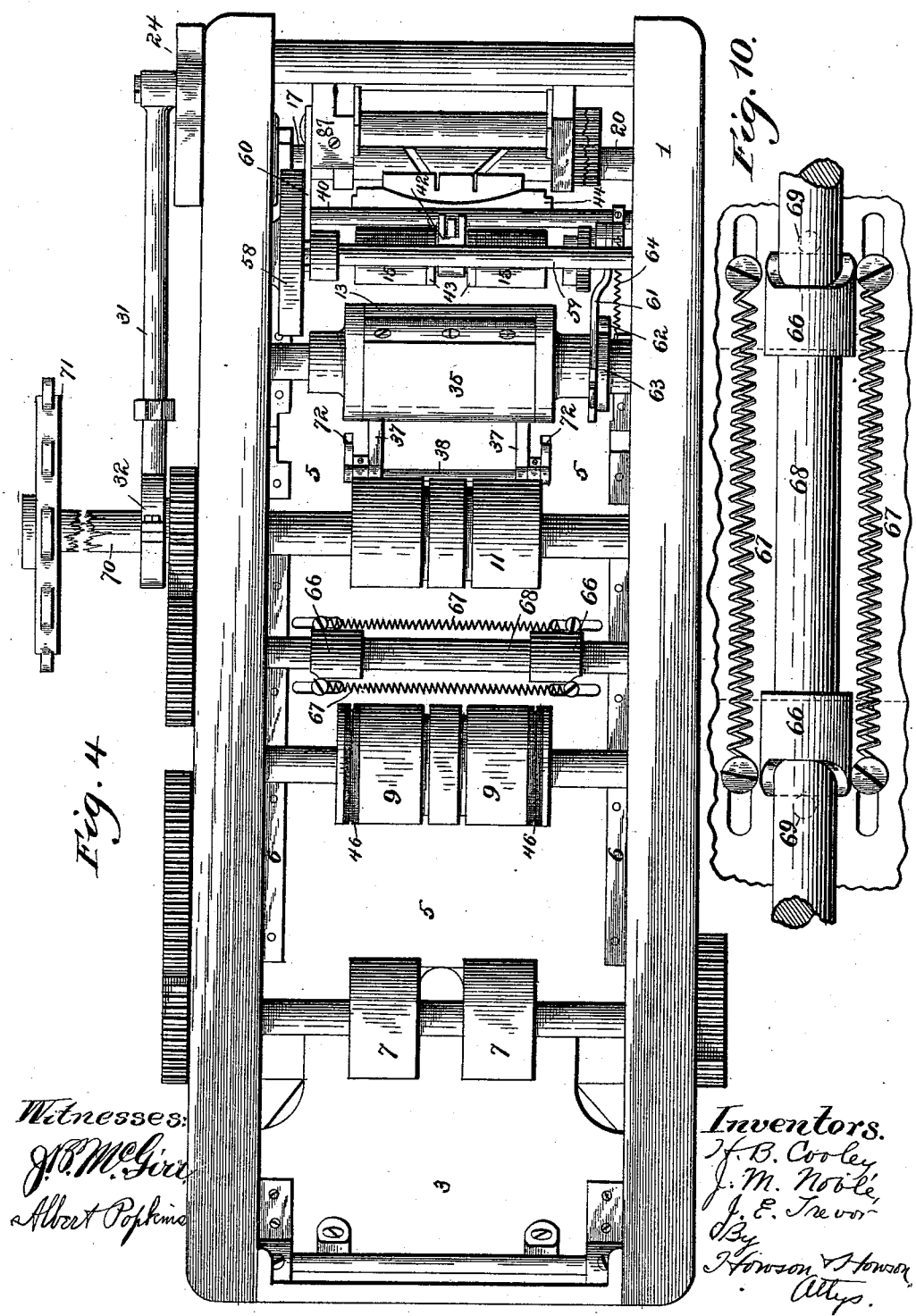

(No Model.) 6 Sheets—Sheet 5.
H. B. COOLEY, J. M. NOBLE & J. E. TREVOR.
MACHINE FOR MAKING ENVELOPES.
No. 541,470. Patented June 25, 1895.
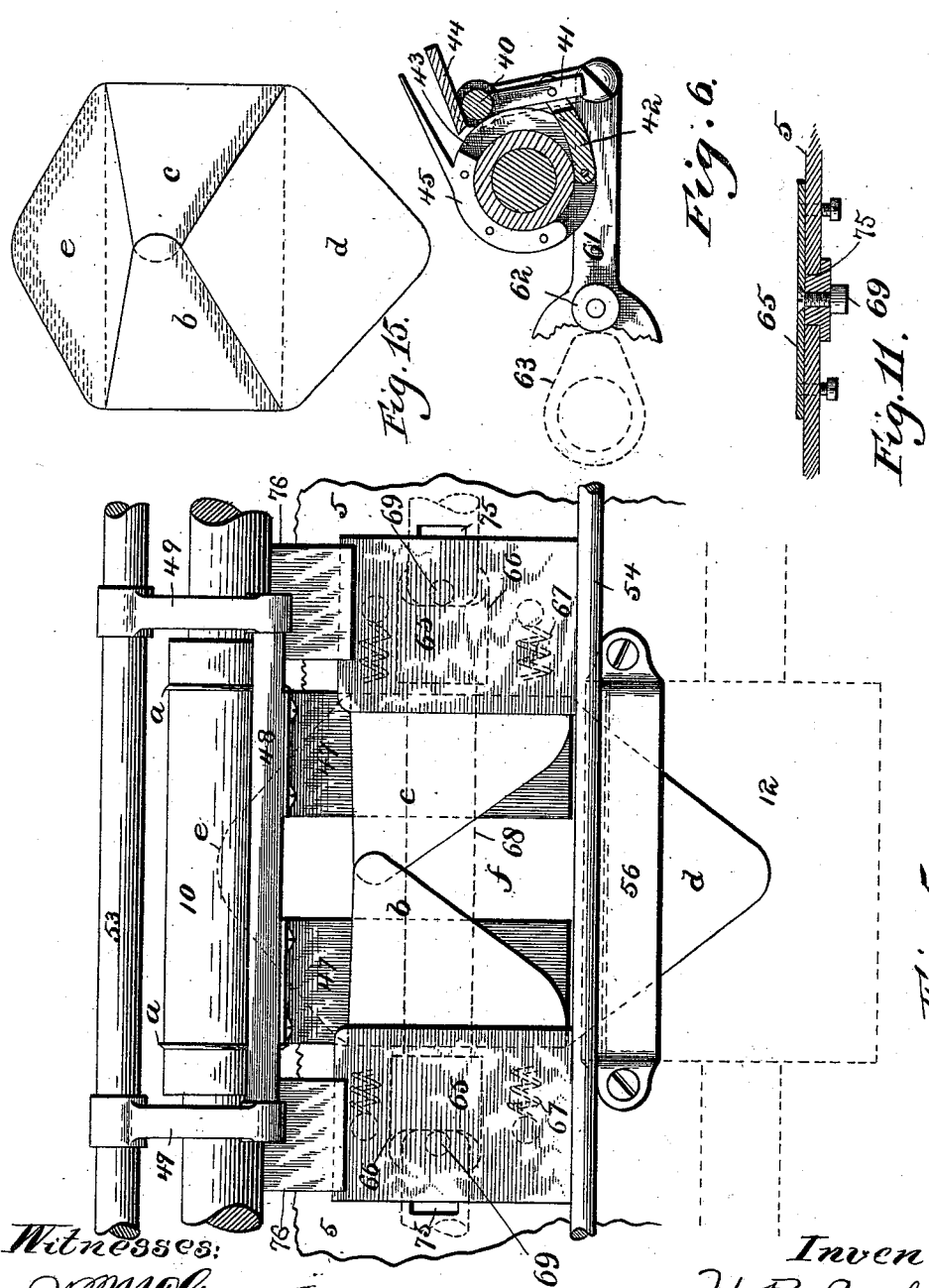

(No Model.) 6 Sheets—Sheet 6.

H. B. COOLEY, J. M. NOBLE & J. E. TREVOR.
MACHINE FOR MAKING ENVELOPES.

No. 541,470. Patented June 25, 1895.

Witnesses:
Inventors,
H. B. Cooley,
J. M. Noble,
J. E. Trevor,
By Howson & Howson
Attys

United States Patent Office.

HENRY B. COOLEY, JOHN M. NOBLE, AND JAMES E. TREVOR, OF HARTFORD, CONNECTICUT.

MACHINE FOR MAKING ENVELOPES.

SPECIFICATION forming part of Letters Patent No. 541,470, dated June 25, 1895.

Application filed July 2, 1894. Serial No. 516,277. (No model.)

*To all whom it may concern:*

Be it known that we, HENRY B. COOLEY and JOHN M. NOBLE, citizens of the United States, and JAMES E. TREVOR, a subject of the Queen of Great Britain and Ireland, all residing at Hartford, county of Hartford, Connecticut, have invented certain new and useful Improvements in Machines for Making Envelopes, of which the following is a specification.

The object of our invention is to construct a machine for making envelopes from the blanks, which will be effective in operation, and capable of materially increasing the output over machines for like purpose now in use; and with this general object in view we have produced an improved mechanism for folding blanks and for feeding the blanks to the gumming mechanism, and improved mechanism for applying the gum to the flaps, and for pressing the said flaps after passing through the gumming mechanism; and in general we have by our invention materially improved the construction and operations of machines of this class.

Our invention consists in the novel machine and parts of the same shown in the accompanying drawings and hereinafter described and claimed.

Figure 12:
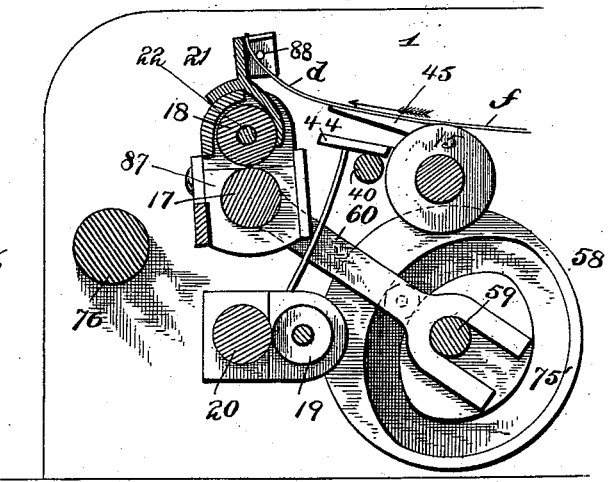
Figure 13:
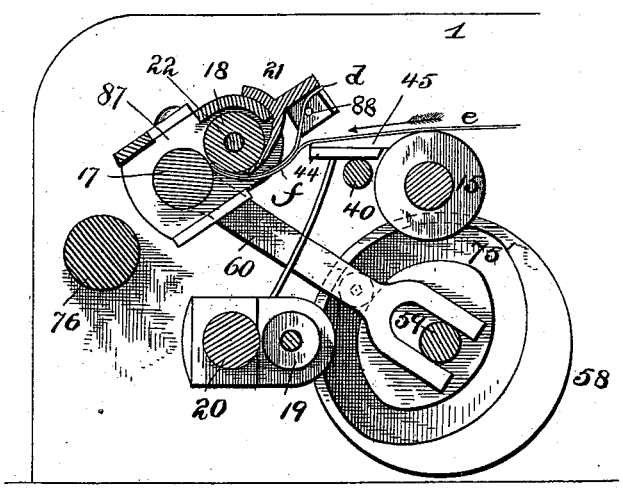
Figure 14:
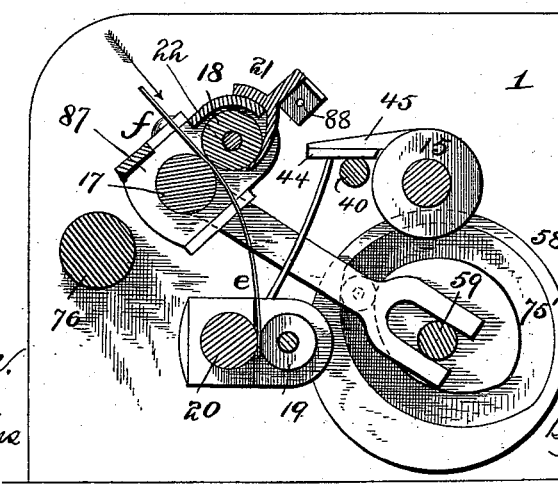

In the drawings, Figure 1 is a top plan view of our invention. Fig. 2 is a side elevation of the same. Fig. 3 is a longitudinal vertical section on line 3 3, Fig. 1. Fig. 4 is a bottom plan view of the invention. Fig. 5 is a top plan view of the folding mechanism. Fig. 6 is a detailed view of the kicker mechanism. Fig. 7 is a sectional detail on line 7 7, Fig. 1. Fig. 8 is a vertical section of part of the lower gumming-roll. Fig. 9 is a transverse vertical sectional detail of the impression-roll and pawl mechanism. Figs. 10 and 11 are details of the folding-plates. Figs. 12, 13 and 14 are sectional details of the pressing and delivering rolls. Fig. 15 is a view of the blank with side flaps folded and gum applied thereto.

The same reference characters designate like parts in the different views, in which—

1, indicates the side frames which support in suitable bearings, 2, the various rolls, their operating mechanism and the table on which the blanks travel in their passage through the machine.

The feed table, 3, is attached to the end of the machine and is preferably of the form shown and described in our pending application, filed January 17, 1894, Serial No. 497,203, though it is to be understood that the feed table and its feeding mechanism do not form any part of the present invention and may obviously be replaced by any suitable feeding mechanism.

Briefly described, this feeding mechanism, as shown, consists of the inclined table, 3, provided with the guide posts, 4, between which the blanks rest upon the table with their front flaps extending over an aperture in the table. Journaled below the table are two feed rolls, 7 and 8, the upper one of which is recessed for the passage of the front end of the blank therethrough when it is separated from the bottom of the pile by the reciprocating suction pipe, 74, shown in dotted lines and operated by any suitable mechanism. As the blank is drawn downward by the suction pipe it comes tangent to the lower rolls, 7, at which point the upper roll grips the said blank between the edge of the recess and the surface of the lower roll, stripping the blank from the pipe and the two rolls feed it forward upon the inclined table, 5, which is secured by suitable brackets, 6, to the sides of the frame of the machine. A stay rod, 76', at the rear of the machine connects the two side frames at this point.

At a suitable distance from the feed rolls, 7 and 8, are located the creasing rolls, 9 and 10, journaled in bearings on the side frames of the machine, the upper one of which is provided circumferentially near each end with beveled flanges, *a*, forming knife edges, and upon the lower roll are placed rubber or suitable flexible bands, 46, let into grooves near each end thereof. The knife edges of the flanges, *a*, are set apart from each other a distance equal to the length of the body of the envelope, and rotate in contact with the flexible bands in the lower roll. By these rolls the blank is creased along the line between the side flaps and the body of the envelope, preparatory to the folding of said flaps over on to the body of the blank by the folding mechanism through which the blank next passes.

Secured to a shaft, 68, below the table, 5, are two cams, 66, set with their acting surfaces in line upon the same side of the shaft so that as the shaft rotates the two thin folding plates, 65, will be caused to move toward and from each other through the medium of the studs, 69, upon the plates projecting downwardly through slots 75, in the table and held in contact with the said cams by suitable springs, 67, attached to screws on the plates, passing through slots in the table, 5. The front edges of the two plates, 65, work under the guiding strips, 76, secured close against the table, 5, causing the flaps, $b$, and $c$, to pass above the plates, 65.

Secured to a cross bar, 48, by arms passing over the roll, 10, are two thin guide plates, 47, having their outer edges in line with the creasing flanges, $a$. The cross bar, 48, is connected by arms, 49, with the rock shaft, 53, which has an arm, 50, in which there is a set screw, 51, normally pressed against the side of the journal bearing, 2, by a spring, 52, the tension of which is regulated by the set screw to obtain the proper pressure of the plates, 47 against the table, according to the thickness of the paper passing under the same. The movement of the plates, 65, inward, is sufficient to over-lap the two thin guide plates, 47, and fold the flaps, $b$ and $c$, of the blank, as shown in Fig. 5. The cams, 66, are formed with a dwell sufficient to cause the folders, 65, to remain in their outer position until the side flaps, $b$ and $c$, pass over and clear the guide strips, 76, and the upper surface of the said folders; and upon clearing these guide strips the acting portion of the cams, 66, cause the plates to move quickly toward each other, folding the said flaps over the thin guide plates, 47. The envelope is now to be creased along the longitudinal edges of the body. This is accomplished by the next pair of rolls, 11 and 12, which are journaled one above the other, and receive their motion through suitable gears on the outer ends of their shafts, as shown in Fig. 1, the lower roll in the present instance being mounted upon the main driving shaft, 70, to which is secured a sprocket wheel, 71. The upper roll, 12, has two longitudinal ribs, 77, located circumferentially a distance apart equal to the width of the body of the blank and meshing with corresponding grooves, 78, in the lower roll, 11.

Secured to the table, 5, in front of the two rolls is a guide plate, 56, extending across the table and attached at its outer ends to the table by any suitable means, and bent upwardly for the purpose of insuring the proper alignment of the blank as it enters between the two creasing rolls.

Attached to the cross bar, 54, are two wires, 55, extending rearward to the last fixed pair of rolls in the machine, 15 and 16, passing through grooves in the rolls near the outer ends, as shown clearly in Figs. 1 and 3. These wires serve as guides for the envelopes which pass between them and the table, 5, and also act as strippers.

The gumming rolls, 13, and 14, are mounted in the frames to the rear of the last two creasing rolls, and are so constructed that they will rotate in contact only while gum is being applied to the flaps of the envelope. To accomplish this we provide the upper roll, 14, consisting of two end disks or hubs, and a cylindrical body portion between them, having attached to its surface, at a proper distance apart, two gummers, 28, and 29, which are preferably of metal and have their outer surfaces flush with the circumference of the end disks. The lower or impression roll, 13, consists of two flanged hubs, 79, between which is rotatably mounted the impression roll, 13, which is intermittently rotated by the clutching mechanism to be described. The outer surface of the impression roll is provided with a pad of rubber or other suitable flexible material against which the envelope blank rests as the gum is being applied by the rotating gumming roll. The surface of the lower roll, 13, is cut away at 33, and is provided at the forward end thereof with a hard metal bearing strip, 34, against which gravity pawl, 37, normally acts to hold the roll against rotation.

In the body of the impression roll are formed recesses in which are located pins, 39, normally pressed outward by a spring, 40', to cause the beveled end of the pins to enter corresponding recesses in the flanged hubs. As long as the pawl, 37, engages the strip, 34, the flanged hubs which are secured to the central shaft will rotate with the said shaft. As the recesses therein pass the pins they will be forced into the same by the spring but will be forced out again since the roll, 13, is held against rotation by the pawl, 37. In order to cause the two flanged hubs to be locked by the pins, 39, to this roll it is necessary to release the pawls, 37. This is effected by the envelope before it passes between the gumming rolls in the following manner: The pawls, 37, are secured upon each side of the machine to rock shaft, 38, journaled below the table, and from which arms, 72, project upwardly through slots, 80, in each side of the table, outside of the line of travel of the blank; and upon the upper ends of said arms are fingers, 36, curved on the lower faces and offset laterally to bring them within the outer limits of the blanks. These fingers or trips project through openings, 81, their ends extending slightly below the table. As the paper or blank comes in contact with the fingers, 36, the pins will be in the position of entering the recesses in the flanged hubs, 79, and the entering edge of the said pins will exert a pressure upon the forward side of the recess, tending to move the roll, 13, which is free upon its shaft, slightly backward, thus relieving for the time the pressure of the pawls, 37, upon the strip, 34; and as the blank is now moving against the fingers, 36, the latter will be raised to allow the blank to pass under them, thereby disengaging the pawls, and consequently the pins will lock the hubs and the roll together, causing them to rotate together, bringing the pad, 35, underneath the blank as the gummer comes into position to spread the gum upon the flaps.

In the further rotation of the roll, 13, the pawl, 37, drops into groove 33, and coming in contact with the bearing strip, 34, again holds the said roll, 13, against rotation until the next blank comes under the fingers, 36. By this mechanism it will be seen that the lower roll is only rotated when the blank or paper is between it and the upper roll, thereby preventing the gummers from depositing the gum upon the rolls themselves, thus avoiding the necessity of frequent stoppage of the machine to clean the rolls.

Although two recesses, 40', and two springs are shown in the roll, 13, it is obvious that a single opening running through the entire length of the roll, with a single spring therein between the two pins, may be used; and while two pins are preferable, it is to be understood that one pin and recess might be used for the purpose.

Mounted above the roll, 15, is a skeleton roll, formed of the two hubs, 16 secured to the shaft, 26, which is rotated by a gear, 82, meshing with a gear, 83, upon the shaft, 84, carrying the lower roll, 15. This lower roll, 15, is made of two cylindrical portions between which is rotatably mounted the flanged collar, 43, upon the same shaft. Between the flanges of this collar is secured a finger, 45, which in its normal position rests upon the oscillating table, 44. This table, 44, is mounted upon the rock shaft, 40, which receives the rocking motion from cam 63, through the arm, 61, on which there is a friction roller, 62, held in contact with the said cam by a spring, 64, connecting the arm with a fixed part of the machine. The flanged collar, 43, is connected to the rock shaft, 40, by a link, 42, pivotally connected to the arm, 41. The cam, 63, is so timed that it will cause, through the intervening mechanism described, the collar to rock upon its shaft, elevating the finger, 45, at the same time slightly rocking the table, 44. This finger throws the advancing flap of the blank upward, as shown in Fig. 12, for the purpose to be presently described.

Mounted upon a shaft, 22, in fixed bearings in the frame of the machine, is a roll 18, upon the shaft of which roll is journaled a frame, 87, to which frame is secured the check box, 21, having two convergent sides, through which preferably pass pins, 88. In the lower portion of said frame the lower pressing roll, 17, is mounted, driven by a gear on its end meshing with a gear on the shaft, 22. It thus receives its motion of rotation from the shaft of the roll 18, and is capable of a rocking motion with the frame around the said roll as a center. The roll, 18, receives an oscillatory motion from the quadrant rack, 24, mounted on the frame, 1, vibrated back and forth by the eccentric, 32, on the main driving shaft connected to the quadrant by its rod, 31. A pinion, 23 on the end of the shaft, 22, imparts to the said shaft an oscillatory motion from the quadrant rack. Upon the shaft, 59, rotated by a gear, 89, is a cam, 58, in the groove, 75', of which runs a roller attached to an arm, 60, which is connected to the frame, 87, thereby imparting to said frame an oscillating motion around the shaft, 22.

Located below the pressing rolls, 17 and 18, in suitable bearings, are two delivery rolls, 19 and 20, through which the blank is finally passed, after passing twice between the rolls, 17 and 18, by which means, as will be presently seen, the gummed flap is a second time pressed, to prevent it from loosening, thereby insuring its permanent attachment to the side flaps of the envelope against which it is forced. The operation of this portion of device will be better understood with reference to Figs. 12, 13 and 14, in connection with Fig. 2. As the envelope is passed under the skeleton roll, 16, the forward flap, d, which is to be permanently secured to the side flaps, is kicked upward by the finger or kicker, 45, diverting the end, d, from the horizontal plane into the check box, 21, which now begins to move to the rear around the shaft, 22, by the arm, 60, and its operating cam. As the frame, 87, is now oscillated by the arm, 60, the box, 21, assumes the extreme upward position, as shown in Fig. 12, where it dwells until the envelope is forced against the same, causing the flap to assume a position at substantially right angles to the body f, of the blank, thus folding at the crease between the two. At this point the cam, 58, begins to move the frame through the arm, 60, toward its higher position, the feeding rolls, 15 and 16, meantime forcing the body of the blank underneath the flap, d, as shown in Fig. 12, at about forty-five degrees to the vertical, and causing the folded envelope to pass between the rolls 17 and 18, which are now operated by the quadrant, 24, and the pinion, 23, in the direction to draw the blank upward through them, pressing the gummed flap tightly down against the edges of the side flaps. These rolls are so timed as to draw the blank through them until the body of the envelope has entirely passed between them leaving the flap, e, projecting downwardly from these rolls. The quadrant is now reversed, thereby reversing the operation of the rolls which remain in the position shown in Fig. 4, until the blank is fed through the lower delivering rolls, 19 and 20, one of which should be a skeleton roll similar to the roll 15, in order to prevent the gum on the rear end flap from coming in contact therewith.

To insure the blank aligning with the lower delivering rolls, we preferably suspend from the table, 44, two wires, 85, one at each end, thereby insuring a proper guiding of the blank between the said rolls.

The skeleton roll, 16, is preferably mounted in yielding bearings, such for example, as that shown in Fig. 7, where 25 indicates a pivoted arm in which the shaft, 26, of said roll is journaled, the opposite end of the arm having a finger projecting within a recess in the side frame in which spring, 27, is located and bears upon said arm. By this arrangement the envelope passing between the rolls cannot in any case be torn or diverted from its course, since the yielding pressure upon the bearings will allow for any occasional varying thickness between the lower roll and the limited bearing surfaces of the skeleton roll, which would not be the case if the bearing between the two rolls were rigid and unyielding.

As shown in Figs. 1 and 2, the fixed rolls forward of the driving shaft, 70, receive their motion from said shaft through the intermeshing gears, 90, 91, 92, 93, 94, 95, 96, 97, 98, and 99, while the rolls to the rear of the shaft receive their motion through the gears 91, 101, 100, 102, 103, 104, 89, 83, 82, 105 and 106, in the order named. The gears must of course be properly timed to cause the blank to pass from the feeding rolls to the folding mechanism at the proper time; and from the rolls 15 and 16 to the check box at such time as to secure the operation of the rolls 17 and 18, hereinbefore described. The upper series of rolls by the gearing just described, it will be seen, rotate in the same direction with one another toward the feed table while the lower rolls rotate in the opposite direction.

While we have shown a quadrant rack and the operating eccentric for transmitting the oscillatory motion to the first set of pressing rolls, we do not wish to be confined to this specific means as the various mechanical motions might be adopted for accomplishing this motion without departing from our invention. It is also to be understood that the various changes may be made in the details of our invention and still remain within the scope of the same.

We cut away a portion of the hubs forming skeleton roll, 16, as shown at 86, so as to release the grip on the blank as the motion given the rolls 17 and 18 by the quadrant rack causes them to draw the blank forward faster than the peripheries of the rolls 15 and 16 travel. We prefer to cut away a portion of the roll, 9, as shown at $g$, Fig. 3, for the purpose of allowing the blank to fully enter between the rolls and insure the gripping of the same.

It will be observed that the gum is put upon the end flap, $e$, and the side flaps, $b$ and $c$, after these side flaps $b$ and $c$, have been folded; and the gumming is consequently the last operation performed by the machine prior to sealing the end flap $d$ to the side flaps. The advantage of applying the gum to the side flaps $b$ and $c$ instead of to the end flap, $d$, is that the side flaps having been folded and pressed down will not curve when the wet gum is applied thereto as would be the case where the gum is applied to the end flap $d$. These side flaps will, therefore, remain flat against the body of the envelope, thus avoiding the liability of depositing gum upon the working parts of the machine, while making the gumming operation the last one before sealing is conducive to the same result and likewise gives the gum less time to dry before the end flap is sealed to the side flaps.

We are the first to construct a machine in which the gum is applied to the side flaps of the envelope in the particular manner hereinbefore described, after the said flaps have been folded and we think the features of our machine for accomplishing this purpose constitute valuable points of advantage over the prior art.

The distance between the various sets of rolls will of course be governed by the size of the blanks used; and the proportions of the various parts, such as length of the rolls, the size of the gumming surface, its shape, &c., in like manner depend upon the size of the envelope to be made.

We have not shown the gum reservoir and the rolls for distributing the gum upon the gummers, as these features do not form any part of our invention, and any of the usual means employed for this purpose may be adopted in connection with our mechanism.

A machine constructed according to our invention possesses the advantages of greater simplicity and cheapness of construction; and is more compact and solid, requiring much less floor space than other machines now in use for making the same size envelope. It is also free from jarring or straining motions, insuring a longer life to its parts, while the direction of motion of the blank is constant throughout the machine, and not varying as in other machines of this class; and again, by the use of the reciprocating folding plates we secure a greater accuracy in folding the flaps while the blank is being held by the rolls, and by the use of the rubber bands upon which the transverse creases are made we obtain a better crease, and prevent any lateral displacement of the blank in passing between the creasing rolls.

In setting the various rolls it is to be observed that the distance between them should be less than the width of the blanks, thereby insuring the forward end of the same entering the next set of rolls before the preceding set has released the said blank.

We do not wish to limit ourselves to the specific details of mechanism, which we have described as embodying our invention, as changes in these details may be made without materially departing from the essential features of our invention. For example, the mechanism for securing the reversing motion of the two pressing rolls might be varied without departing from our invention, as we believe ourselves to be the first to pass the blank twice between the pressing rolls as described whereby the gummed flap is effectively attached, and the danger of its becoming loosened, is thus guarded against; and in like manner, the clutching and tripping mechanism employed on the gumming roll might be varied without departing from our invention, as we believe we are the first to provide means for rotating the impression roll of the gummer intermittently for the purpose of preventing the gumming of the said impression roll.

We claim as our invention—

1. An envelope machine comprising supporting frames, and a table over which the blanks are fed, a set of creasing rolls for creasing the blanks along the side flaps, a reciprocating plate folding mechanism located to the rear of the said creasing rolls and operating laterally of the line of travel of the blanks to fold the side flaps, a second set of creasing rolls on the opposite side of the folding mechanism the upper one of which is provided with longitudinal creasing edges for creasing along the end flaps, gumming rolls arranged in the rear of the latter creasing rolls for gumming the flaps, and mechanism for folding and pressing one of the end flaps against the side flaps, substantially as described.

2. An envelope machine, comprising supporting frames, and a table over which the blanks are fed, a set of creasing rolls for creasing the blanks along the side flaps, a folding mechanism located to the rear of the said creasing rolls adapted to fold the side flaps, a second set of creasing rolls located on the opposite side of the folding mechanism for creasing along the end flaps, gumming rolls arranged to apply gum to the front edges of the side flaps and the rear end flap, mechanism for sealing the front end flap to the gummed side flaps, and delivery rolls through which the envelope is delivered, substantially as described.

3. In an envelope machine, mechanism for creasing the blank transversely and longitudinally comprising a set of transverse creasing rolls, consisting of an upper roll having circumferential creasing edges or flanges, and a lower roll provided with bands of yielding material against which the creasing flanges of the upper are adapted to bear, and a set of longitudinal creasing rolls, consisting of an upper roll provided with longitudinal flanges or edges and a lower roll having grooves with which said flanges or edges mesh, whereby straight creases are insured without jar or shock to the mechanism, substantially as specified.

4. In an envelope machine, the combination with mechanism for creasing and folding the side flaps, and mechanism for creasing the end flaps, and the gumming rolls adapted to gum the side flaps after they are folded and also the rear end flaps, of pressing or sealing rolls through which the blank is drawn to fold and seal the rear end flaps, and means for intermittently rotating said rolls in opposite directions, thereby subjecting the body of the blank to two pressing actions of the rolls, thus permanently attaching the end flap to the side flaps, substantially as described.

5. In an envelope machine, the combination with a lower impression roll provided with bands of yielding material seated in circumferential grooves near each end, of an upper creasing roll provided with continuous circumferential flanges adapted to bear upon the bands of yielding material on the lower roll and crease the blank transversely as it is drawn through said rolls, whereby shocks or jars to the mechanism are wholly avoided and straight creases insured, substantially as described.

6. In a folding mechanism for envelope machines, the combination with the table over which the blank passes through the machine, of the guide plates under which the blank is passed, the laterally movable folding plates, adapted to fold the side flaps, and the guide strips overlapping the forward edges of said folding plates and under which the said forward edges slide, and mechanism for causing said folding plates to intermittently move toward and from each other, substantially as described.

7. In an envelope machine, the combination with the creasing rolls, of the stationary plates secured to a cross bar above said rolls, a rock shaft with arms extending therefrom for supporting said cross bar, an arm projecting from one end of said rock shaft and having a set screw in its outer end normally held in yielding contact with a fixed part of the machine, whereby the pressure of said plates upon the table of the machine may be varied with the thickness of the paper passing under the plates, substantially as described.

8. In an envelope machine, the combination with the stationary plates pivotally and yieldingly supported above the table of the machine, means for adjusting the pressure of said plates upon the table, laterally movable folding plates adapted to overlap the edges of the stationary plates, means for intermittently moving the said folding plates, and guides for directing the side flaps of the blank above the folding plates, substantially as and for the purpose set forth.

9. In an envelope machine, the combination with the rolls for creasing the blank transversely, and the folding mechanism for folding the side flaps, of the set of rolls for longitudinally creasing said blank consisting of an upper roll having longitudinal creasing flanges, and a lower roll having longitudinal grooves in its surface adapted to mesh with said creasing flanges in the rotation of the rolls, substantially as described.

10. In an envelope machine, the combination with the gumming roll, of an impression roll loosely journaled upon a shaft below the same and normally held against rotation, a fixed part carried by and rotating with said shaft, and a clutch device between these two parts, with means for releasing the impression roll as the blank passes to the gumming roll thereby allowing the clutch device to lock the impression roll and fixed part together, whereby the impression roll is caused to rotate only when gum is being applied to the blank, substantially as described.

11. In an envelope machine, the combination with the gumming roll, the flanged hubs having recesses in their inner faces and secured to the shaft journaled below the gumming roll, the impression roll rotatably mounted upon the shaft between said hubs, pins within recesses in the body of the roll normally pressed toward the hubs and adapted to enter the recesses therein as the shaft rotates, a pawl for holding the roll against rotation, and means for releasing said pawl, as the blank passes under the gumming roll, whereby the pins may lock the hubs and impression rolls to cause them to rotate together, substantially as described.

12. The combination with the gumming roll of the impression roll free to turn upon its shaft having a portion of its circumference recessed, to clear the gummers, spring actuated pins within said roll, flanged hubs secured to a shaft upon which said roll is mounted, and provided with recesses in their faces into which the pins are adapted to be pressed, a rock shaft having a pawl or pawls normally engaging the front wall of the recess in the impression rolls, fingers or trips extending upwardly from said rock shaft, having their ends below the line of travel of the blank, so that as the blank passes to the gumming roll, the fingers are raised, releasing the pawl and allowing the pins to lock the impression roll and hubs together, substantially as described.

13. In an envelope machine, the combination with the gumming roll, 14, of a shaft carrying flanged hubs, 79, the impression roll, 13, free to turn upon said shaft between the hubs, and having a recess, 33, in its surface, spring pressed pins, 39, adapted to enter recesses in the flanged hubs, the rock shaft, 38, journaled below the table of the machine, pawls, 37, carried by said shaft and engaging the impression roll, fingers or trips, 36, attached to arms, 72, on the rock shaft, and having their outer ends extending slightly below the table, whereby the blank may lift the fingers as it passes under the same to release the pawls, substantially as and for the purpose set forth.

14. In an envelope machine, the combination with the mechanism for creasing the blank and folding the side flaps and the gumming rolls, of the feeding rolls so located as to receive the gummed blank from the gumming rolls, positively operated mechanism for engaging the bottom side of the blank and raising the advancing point of the blank, and means for checking the travel of the said point while the blank is being fed forward by the feed rolls thereby folding the front flap at the crease, and pressing rolls between which the blank passes, substantially as described.

15. In an envelope machine, mechanism for folding and permanently attaching the gummed flaps of a blank consisting of a skeleton roll journaled above the table of the machine and bearing upon the outer edges of the blank, a roll, journaled below the same, a vibrating finger or kicker upon the shaft of said lower roll in line with the advancing point of the blank, means for intermittently raising said finger to direct the point of the blank upward, a pair of pressing rolls, and a check device above the same against which the point of the blank is forced and held while the feed rolls pass the blank forward causing it to fold at the end flap and enter the pressing rolls thereby securing the end flap to the side flaps, substantially as described.

16. In an envelope machine, the combination with the feed rolls, of the kicker mechanism consisting of the oscillating collar journaled upon the shaft of the lower roll, the finger or kicker secured to said collar across the line of travel of the point of the blank, a rock shaft pivotally connected to said collar, and means for intermittently rocking said shaft, substantially as and for the purpose set forth.

17. In an envelope machine, the combination with the feed rolls, of a finger vibrating across the line of travel of the point of the advancing flap of the blank, means for intermittently vibrating said finger to divert the point of the flap upward, and a checking device to hold said point while the body of the blank moves under said flap, thereby folding the said flap upon the blank, substantially as and for the purpose set forth.

18. In an envelope machine, the combination with the gumming roll journaled above the table and the impression roll below the said table, of the feed rolls for receiving the blank from the said gumming roll, a collar loosely mounted upon the shaft of the lower feed roll, a finger over which the blank passes secured to said collar, a rock shaft below said finger, and operatively connected to the collar, a cam on the shaft of the impression roll, and connections between said cam and rock shaft, for operating the latter, substantially as and for the purpose set forth.

19. The combination with the shaft, of a collar loosely mounted on said shaft, a finger secured to said collar, a rock shaft carrying a table thereon and connected to the collar, against the upper surface of which table the said finger normally rests, with means for rocking said shaft intermittently, as and for the purpose set forth.

20. In an envelope machine, the combination with the feed rolls and kicker mechanism, of the upper pressing roll journaled in fixed bearings, a frame journaled upon the shaft of said roll, a check box secured to said frame above the said roll, a lower roll mounted in bearings in the frame and rotating in contact with the upper roll, mechanism for rotating said rolls, first, in one direction and then in the opposite direction, and mechanism for oscillating intermittently the said frame about the shaft of the upper roll as an axis, substantially as described.

21. In an envelope machine, the combination with the kicker mechanism, of the upper pressing roll journaled in fixed bearings, a frame having the check box thereon mounted upon the shaft of said roll, a lower roll journaled in said frame and driven by and rotating in contact with the upper roll, a cam secured to and rotating with a shaft below the table of the machine, a link operatively connecting said cam with the frame, whereby the said frame may be oscillated about the shaft of the fixed roll as an axis, substantially as and for the purpose set forth.

22. In an envelope machine, the combination with the gumming mechanism, of the feed rolls, 15 and 16, the vibrating finger, 45, with means for vibrating the same, the upper pressing roll, 18, the frame, 87, journaled on the shaft of said roll, and having the check box, 21, secured thereto, the lower roll, 17, journaled in the frame, means for vibrating the frame toward and away from the feed rolls to cause the flap, first, to enter the check box as it is raised by the finger, second, to fold the body of the blank under said flap, causing the fold to enter between the pressing rolls through which the said flap is drawn, and means for giving an oscillatory motion to the pressing rolls whereby the blank is first drawn through the rolls to secure the end flap to the gummed side flaps and then passed downwardly, and a set of rolls below the table to receive the blank and deliver the same to the point desired, substantially as described.

23. In an envelope machine, the combination with the fixed roll, 18, having a pinion, 23, on its outer end, a movable roll, 17, mounted on a frame journaled on the shaft of said fixed roll, and receiving its motion of rotation from the latter, a quadrant rack with which said pinion meshes and mounted upon the frame of the machine, and means for vibrating said rack to give a motion of rotation to the said rolls first in one direction, then in the reverse direction, substantially as and for the purpose set forth.

24. In an envelope machine, the combination with the pressing roll, 18, having a pinion, 23, on its end, the frame mounted upon the shaft of said roll, the lower roll, 17, journaled in said frame, mechanism for vibrating said frame about the shaft of the roll, 18, as an axis, the quadrant rack, 24, meshing with the pinion, 23, a rotating shaft of the machine, and an eccentric on said shaft connected to the quadrant rack for vibrating the same, substantially as described.

In testimony whereof we have signed our names to this specification in the presence of two subscribing witnesses.

HENRY B. COOLEY.
JOHN M. NOBLE.
JAMES E. TREVOR.

Witnesses:
EZRA SMART, Jr.,
JOHN DARBY.